E. T. THOMAS.
RAILROAD TIE SAWMILL.
APPLICATION FILED APR. 1, 1908.
933,932.
Patented Sept. 14, 1909.
2 SHEETS—SHEET 1.
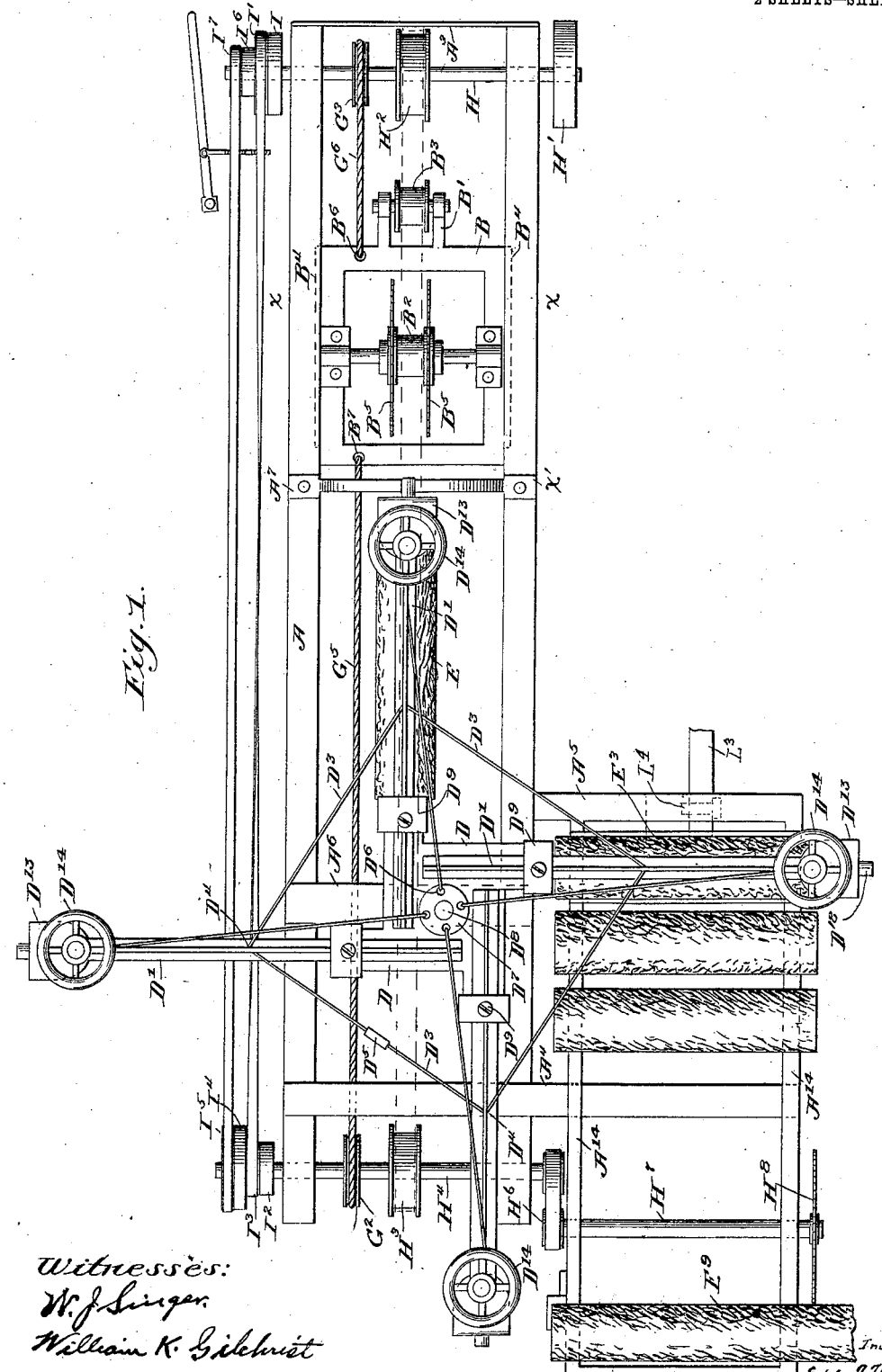

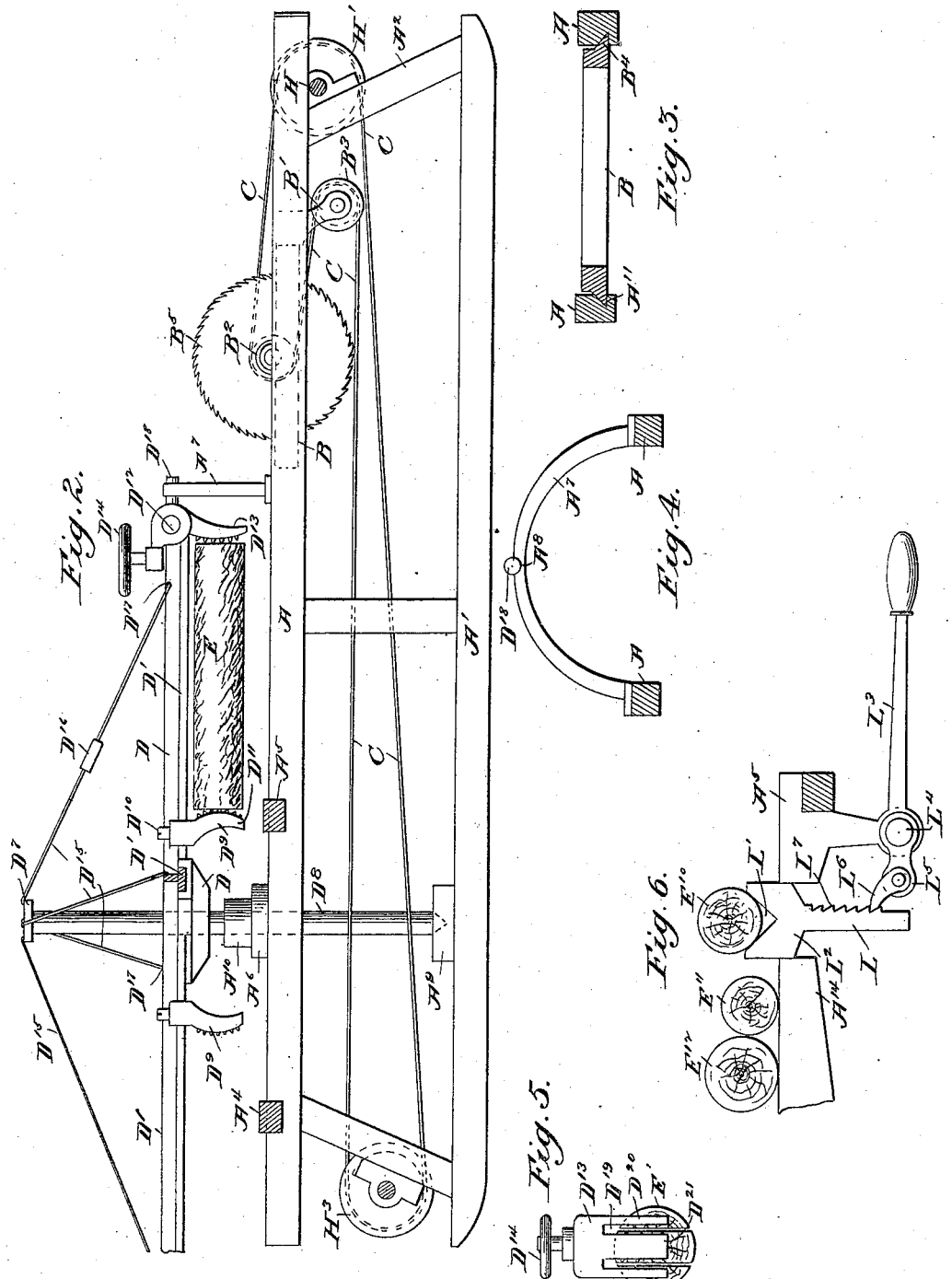

UNITED STATES PATENT OFFICE.

EDDY T. THOMAS, OF BROOKLYN, NEW YORK, ASSIGNOR TO R. J. CAMPBELL, OF NEW YORK, N. Y.

RAILROAD-TIE SAWMILL.

933,932.  Specification of Letters Patent.  Patented Sept. 14, 1909.

Application filed April 1, 1908. Serial No. 424,574.

*To all whom it may concern:*

Be it known that I, EDDY T. THOMAS, citizen of the United States, and resident of Brooklyn, in the county of Kings and State of New York, have invented certain new and useful Improvements in Railroad-Tie Sawmills, of which the following is a specification.

My invention relates to saw mills, particularly such as are portable, and it consists essentially, in the combination of a feeding frame adapted to receive and hold the log or billet to be sawed and to feed it, in a plane at right angles to the plane of the saw blade, to registry with the saw blade, and a traveling saw carriage adapted to support, preferably, two vertically set circular saws, together with said saws, means for causing the saw carriage to traverse, lengthwise, the field or space occupied by the log and means for meanwhile operating the saw to reduce the log to the desired dimensions: also various subsidiary features more particularly specified in the claims.

Figure 1 is a plan view of a saw mill, embodying my invention, together with the cut off saw and the arrangement of parts for carrying the logs to position for engagement with the feeding device, some parts being omitted for clearness, the particular mill shown being one designed especially for sawing railroad ties. Fig. 2, is a side elevation of said machine, showing the driving belt and connected parts. Fig. 3 is a vertical cross section view of the frame and the saw carriage, on the line $x$ $x$ of Fig. 1. Fig. 4, is an end view of the rest for the tie arms, also showing the frame in section. Fig. 5, is a detailed view of the tie clamp or dog. Fig. 6, is a side elevation of the log raising mechanism, the skids for holding the logs and several logs thereon.

I first construct a strong frame composed, preferably of two longitudinal upper beams or top A; two longitudinal base beams $A^1$, supporting legs $A^2$, extending from base to top and cross tie beams $A^3$, $A^4$, $A^6$, $A^9$, binding the whole firmly together.

On the upper beams A, I mount a saw frame B, composed of longitudinal and cross beams, also securely framed. The longitudinal beams of frame B are provided with extensions or flanges $B^4$, preferably, triangular in cross section, which project into guide slots or channels $A''$ cut in the inner sides of beams A. The frame B is adapted to slide longitudinally back and forth within the frame composed of beams A, and upon a suitable shaft or arbor journaled in its side portions, it carries a pulley and mandrel $B^2$, supporting the two circular saws $B^5$.

At one end, frame B is provided with bracket arms $B^1$, which carry, between them, an idler pulley $B^3$, and at the respective ends of the main frame are two pulleys $H^2$ and $H^3$, one $H^2$, preferably on a shaft H journaled in the main frame at such an elevation that the upper surface of pulley $H^2$ will lie in about the same plane as that of the upper surface of pulley $B^2$ and the other $H^3$, preferably, supported on a shaft $H^4$ also journaled on the main frame at the other end and at such an elevation that the upper surface of pulley $H^3$ will lie as low as, or below the lowest level of the saw blades $B^5$. The, preferably, endless belt C is passed about $H^3$, to, about and over pulley $H^2$, thence to and over pulley $B^2$, back under it and to and over idler pulley $B^3$ and thence back to pulley $H^3$.

It will be manifest that if motion is communicated to the belt C, it will drive the saws and, moreover, that it will continue to do so, though the longitudinal position of the frame B and its pulley $B^2$ be continually changed, provided the belt C be driven at a greater speed than that of the movement of frame B.

On the outer end of shaft H, I mount a main driving pulley $H^1$, adapted to be driven by a suitable belt from any source of power. Shafts H, $H^4$, also respectively carry grooved pulleys $G^3$ and $G^2$ and a cable, (whose ends $G^5$, $G^6$, are secured in openings $B^7$, $B^6$ in the frame B), extends from one of said openings $B^6$, to and about pulley $G^3$ (which is loose on shaft H) then to and about pulley $G^2$ and then back to the frame B at $B^7$. Shaft H also carries, beyond the frame A, two loose pulleys $I'$, $I^6$ and two tight pulleys I, $I^7$ and shaft $H^4$ carries two tight pulleys $I^2$, $I^5$, and two loose $I^4$, $I^3$ (though I may use four, the parts $I^3$, $I^4$ as loose pulleys and $I^2$, $I^5$ as tight ones). A straight belt runs from $I^7$ to $I^5$ and a cross belt from $I'$ to $I^3$.

When motion is given to shaft H, by means of the belt on pulley $H'$ that motion will, of course, be communicated to pulley $I^7$ and thence by the straight belt, to pulley $I^5$, shaft $H^4$, pulley $G^2$ and cable $G^5$, $G^6$, which will be drawn forward (to the left) carrying frame B and its attached and moving saws to their work of slabbing the log E, held in position for such action.

When the frame has reached its desired limit of forward movement and the log has been sawed as desired, the belts are shifted by the belt shifter to new positions, the straight belt about $I^6$ and the crossed one about I. Thereupon the straight belt will not transfer any power from shaft H, but the crossed belt will and consequently the pulley $I^2$, $I^3$, on shaft $H^4$ will be reversed, as will the cable $G^5$, $G^6$, and the saw frame will return to its initial position, when its motion may again be reversed by a reverse movement of the shifting lever.

Stepped in a suitable bearing piece or cross timber $A^9$ of the main frame, I erect a substantial post $D^8$, passing it through bearings in cross beam $A^6$ and providing it with a collar $A^{10}$ and a cap $D^7$, pierced with rod receiving apertures $D^6$, and to this post, at a level somewhat above the surface of the main frame, I secure a bracket D provided with several (here four) horizontally extending sockets in each of which I mount a horizontal log supporting arm $D^1$, tying the several arms firmly together by rod like ties or braces $D^3$, provided with a turn-buckle $D^5$, for tightening them, and supporting the outer ends by suspension rods or cables $D^{15}$, extending from the cap to points $D^{17}$ near the ends of said arms $D^1$.

On each arm I secure log holding devices, consisting of depending arms or dogs $D^9$, provided with spurs $D^{11}$, adapted to take into the end of the log to be sawed and hold it firmly in place. These dogs $D^9$ are adjustable upon arms $D^1$ and are held to their selected position by set screws $D^{10}$.

At the outer ends of the arms $D^1$ I locate another dog $D^{13}$ pivoted at $D^{12}$ to the said arm, provided with spurs or teeth on the under side and a screw and hand wheel $D^{14}$, the screw passing through a threaded aperture in the upper lug of the dog and resting upon the upper face of arm $D^1$. Said arm $D^1$ has also a supporting lug or extension $D^{18}$, adapted to rest in a depression $A^8$ in a bridge or bracket $A^7$, secured to the frame in such position that said depression will register with the lug $D^{18}$ when the arm $D^1$ is swung to a position insuring the registry of the lines along which it is desired that the saw shall cut with the saw.

The dog $D^{13}$ is preferably formed with a central portion $D^{21}$ containing spurs adapted to take into that part of the log which is to constitute the finished article, arm $D^{20}$ carrying spurs to take into the parts which are to constitute the slabs, when sawed, and channels $D^{19}$ adapted to permit the passage of the saws while the log is being shaped to finished form.

At the side of the main frame the cross bars $A^4$ and $A^5$ extend outward sufficiently beyond the main frame to receive and support skid beams or girders $A^{14}$, extending from the ground level to a level almost as high as the lowest side of arms $D^1$. These girders $A^{14}$ also carry the bearings for a shaft $H^7$, on which I mount the cut off saw $H^8$ and the driving pulley $H^6$, through which power to drive said saw is applied. Connected to the skid arms $A^{14}$ and in an aperture in the platform thus composed of the girders and cross ties, I mount a frame $L^2$ recessed at $L^1$ to receive a log and provided with a downwardly extending arm L notched at $L^7$. Then at $L^4$ I mount a lever $L^3$ carrying a ratchet tooth or dog $L^6$ pivoted at $L^5$ and adapted to engage the notches $L^7$ in the arm L.

The operation of the device is as follows: Logs E, $E^3$, $E^9$, $E^{10}$, $E^{11}$, $E^{12}$, are rolled up on the skids $A^{14}$ and sawed to lengths. As they proceed they, one after another, come upon the elevator $L^2$, immediately under that arm of the feeding device, then extending over the platform. Then the lever $L^3$ is depressed, raising the elevator and its superincumbent log, until that log reaches the level at which it is to be slabbed. It will then lie between the dogs $D^9$ and $D^{13}$. Now the hand wheel $D^{14}$ is turned down, forcing the spurs into the log end and driving the log against the spurs on dog $D^9$, until it is firmly secured to the derrick arm $D^1$. Then the post $D^8$ is rotated until the loaded arm $D^1$ and its supported log are brought into registry with the slabbing saws $B^5$, when lug $D^{18}$, will take into notch $A^8$ and be held securely therein, some power being necessary to force it over the proximate wall of said notch, to a position of rest therein. Then the saw driving mechanism is started and the saws will approach and saw through the log longitudinally, on the desired lines. Meanwhile another log has been placed upon the elevator, raised and secured to the second arm $D^1$. Then, while the saw frame B, is returning to its starting point, the post $D^8$ is again rotated 90 degrees, the finished log is swung to the delivery position, a new log ($E^4$) is brought to the slabbing position and a third arm over the elevator, ready to receive a third log. Thus the action of the mill is almost continuous. One log may be removed and another placed in position, while still another is being slabbed and neither of these operations need wait for the other, and we have in the combination, a substantially continuous feed saw mill, with corresponding celerity and economy in the production of the finished article.

What I claim as my invention and desire to secure by Letters Patent, is:

1. In a saw mill, the combination with the main frame, of a reciprocating saw carriage, adapted to support a vertically set saw, a circular saw mounted therein, a feeding frame composed of a rotatable post carrying a series of log supporting arms, provided as described, with means for holding a series of logs horizontally and for feeding them successively and intermittently, in a plane at right angles to that of the saw, to a position of registry with the said blade, together with means for operating the saw carriage and the saw, all substantially as set forth.

2. In a saw mill, the combination with the main frame, of a reciprocating saw carriage adapted to support two vertically set circular saws, two circular saws mounted therein, a feeding frame composed of a rotating post carrying a series of log supporting arms, provided as described, with means for holding a series of logs horizontally and for feeding them successively and intermittently, in a plane at right angles to that of the saws, to a position of registry with the saw blades, together with means for operating the saw carriage and the saws, all substantially as set forth.

3. In a saw mill, the combination with a main frame, of a reciprocating saw carriage, a circular saw mounted therein, a rotatable post carrying a series of log supporting arms arranged at a level slightly above the saw edge, and adapted to extend parallel with and adjacent to the plane of movement of the saw, adjustable dogs on said arms adapted to receive and hold a log longitudinally between them, a bridge support extending over the path of the saw blade and provided with a securing device, and an extension upon the log supporting arm adapted to move into and rest in said securing device, all substantially as set forth.

4. In a saw mill, the combination with the main frame, of a reciprocating saw carriage, adapted to support a vertically set saw, a circular saw mounted therein, a feeding frame composed of a rotatable post carrying a series of log supporting arms provided as described, with means for holding a series of logs horizontally, and for feeding them successively and intermittently, in a plane at right angles to that of the saw, to a position of registry with the said blade, together with means for operating the saw carriage and the saw, and a platform and skids for receiving and holding the logs, some portion of which is located at an angle from the saw path, whereby it lies under one log supporting arm when a preceding log supporting arm is at registry with the slabbing saw, all substantially as set forth.

Signed at Brooklyn in the county of Kings and State of New York.

EDDY T. THOMAS.

Witnesses:
I. INGLESON,
ASA FRANCIS SMITH.